United States Patent

[11] 3,580,306

[72] Inventor  Jean Paul Tanguay
　　　　　　　St. Prime, Quebec, Canada
[21] Appl. No. 754,606
[22] Filed    Aug. 22, 1968
[45] Patented May 25, 1971
[73] Assignee Placements Jean Paul Tanguay Ltee
　　　　　　　St. Prime, Quebec, Canada
[32] Priority Aug. 24, 1967
[33]         Canada
[31]         998,652
　　　　　　 Continuation-in-part of application Ser. No.
　　　　　　 698,764, Jan. 18, 1968, now Patent No.
　　　　　　 3,500,882.

[54] MOBILE TREE SLASHER
　　　3 Claims, 11 Drawing Figs.
[52] U.S. Cl. .................................................. 143/46F,
　　　　　　　　　　　　　　　　　　　　143/1, 143/157
[51] Int. Cl. ..................................................... B27b 11/12,
　　　　　　　　　　　　　　　　　　　　　　　B27b 31/00
[50] Field of Search .......................................... 143/46, 48,
　　　　　　　　　　　　　　　49, 41, 1, 157-5; 144/3, 312

[56]           References Cited
           UNITED STATES PATENTS
2,569,878  10/1951  Avinger et al. ............... 143/49
3,457,971  7/1969   Maradyn ....................... 143/48
3,500,882  3/1970   Tanguay........................ 143/46

*Primary Examiner*—Donald R. Schran
*Attorney*—Raymond A. Robic

ABSTRACT: An apparatus for cutting trees stems into logs comprising a horizontal conveyor transporting the stems, a first rotary saw for cutting the stems into a first set of logs having twice their final length, an upwardly sloping conveyor for lifting the said first set of logs and a second rotary saw for cutting the first logs in half while the logs are raised. A table for discharging logs from the horizontal conveyor to the upwardly sloping conveyor comprises a sweeping blade extending longitudinally of the transfer table and a hydraulic jack is used for moving the blade laterally across the table to move the logs thereon on the upwardly sloping conveyor. An apron is pivotally connected along one edge thereof to the discharge end of the transfer table and is downwardly inclined towards the sloping conveyor, springs biasing the apron upwardly and chains limiting the upward movement of the apron under the bias of the springs.

INVENTOR
Jean Paul TANGUAY

ATTORNEY

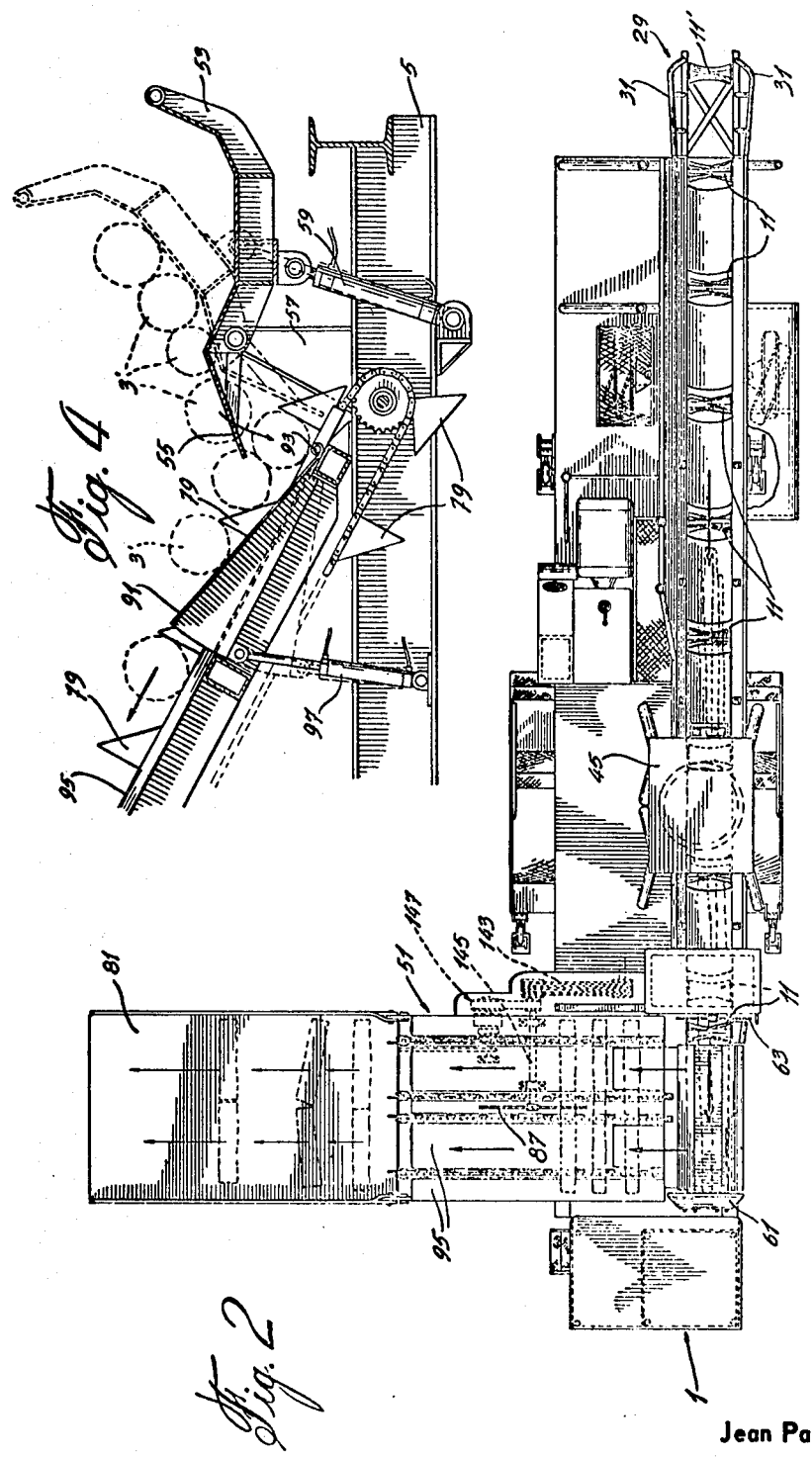

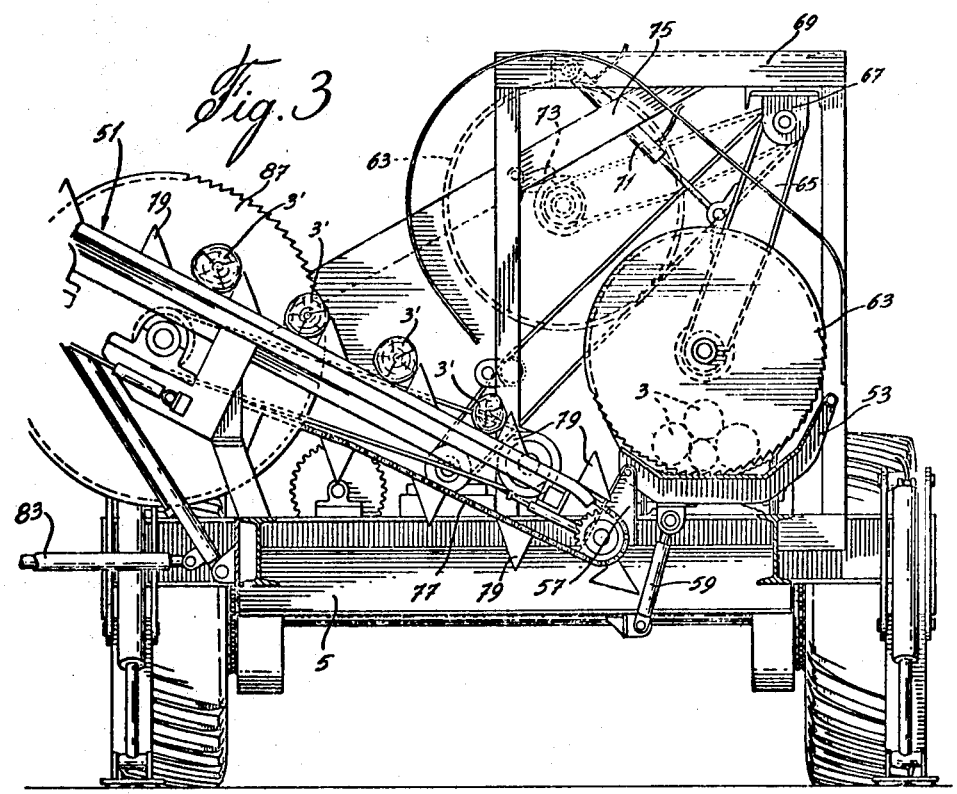
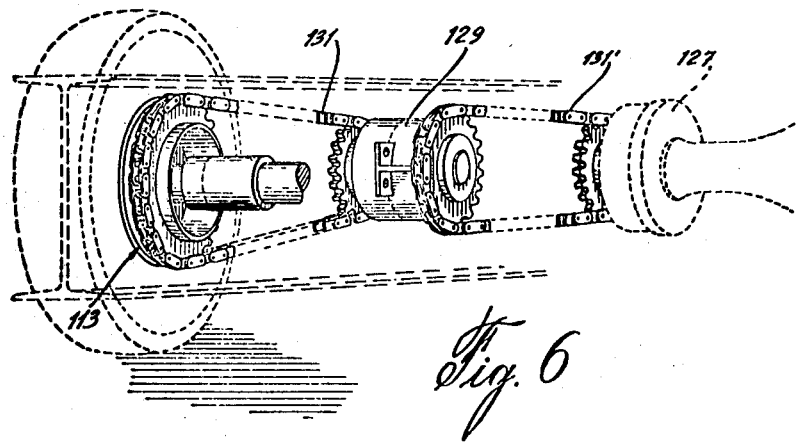
INVENTOR
Jean Paul TANGUAY
ATTORNEY

INVENTOR
Jean Paul TANGUAY

ATTORNEY

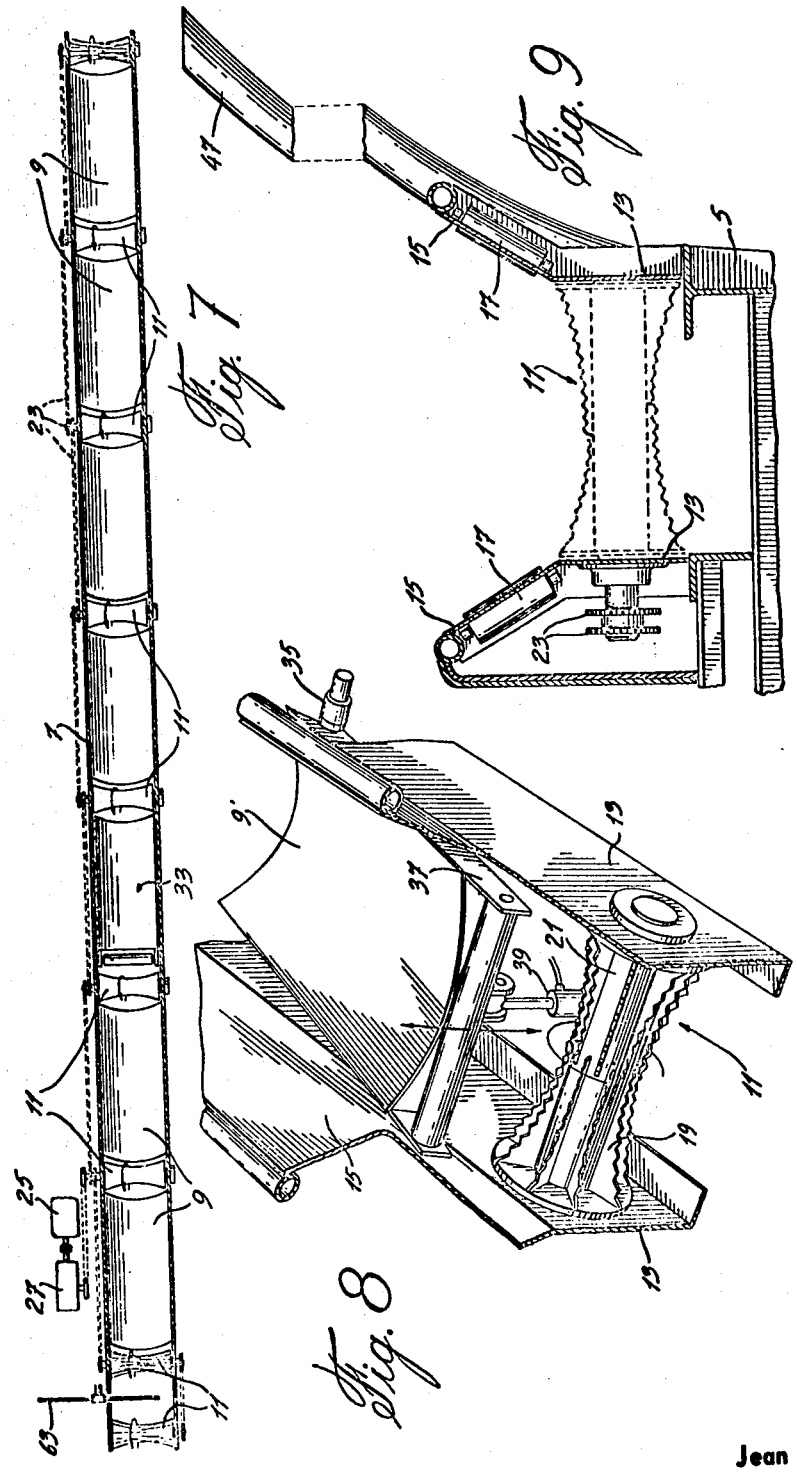

PATENTED MAY 25 1971 3,580,306

INVENTOR
Jean Paul TANGUAY

ATTORNEY

MOBILE TREE SLASHER

The present invention relates to a movable slasher for cutting tree stems and is a continuation in part of my prior U.S. application No. 698,764, filed Jan. 18, 1968, now Pat. No. 3,500,882.

Slashers of this general type are known and the present invention proposes to overcome numerous deficiencies of the present slashers and generally improve the efficiency thereof.

As is known, this type of slasher has an elongated receiving conveyor over which the tree stems are laid and directed toward one end of the slasher for the first cutting operation where the stems are cut into logs of predetermined length. The logs then rest on a transfer table which carries them into a second conveyor extending laterally of the first one and either loading a truck or discharging them on a pile.

A first object of the invention is to provide devices on the first and second conveyors to vibrate the tree stems or logs in order to properly align them on the respective conveyors. The first conveyor is also provided with gripping rollers that can rotate in either direction so that the tree stems are properly aligned on the transfer table prior to their cutting into logs. The transfer table itself is of a novel type which more efficiently and easily carries the logs onto the lateral conveyor.

The latter conveyor is provided with a central saw to cut the logs received from the transfer table into two thus ensuring a more efficient and rapid operation.

In order to prevent piling up of logs, particularly on the second conveyor, the two saws as well as the second conveyor are mounted to be driven in unison.

Another object of the invention lies in the provision that, for safety purposes, the first conveyor will not operate unless the first saw is in inoperative position. The latter is swingable in a vertical plane from an upper operative to a lower inoperative position.

A further object of the invention resides in that the lateral conveyor is detachably mounted on the base of the slasher and posts are provided above the first conveyor for resting the said second conveyor thereon. In this manner, it is possible to build the slasher within the narrow limits as to width whereby it can be driven on conventional roads.

A still further object of the invention resides in the provision of jacks mounted alongside the base of the slasher and usable to lift either of the forward or rearward ends of the slasher or both or to be used to stabilize the slasher in operation.

The invention will now be described in reference to a preferred embodiment illustrated in the appended drawings wherein:

FIG. 2 is a plan view of the slasher of FIG. 1;

FIG. 3 is a partial rear elevation view of the slasher, the operating cab being removed;

FIG. 4 is a partial cross-sectional view in elevation taken in a vertical plane extending through the centerline of the second conveyor;

FIG. 6 is a perspective view of the gear and sprocket mechanism for driving the rear wheels;

FIG. 7 is a longitudinal cross-sectional view of the first conveyor;

FIG. 8 is a perspective view of a kicking device on the first conveyor;

FIG. 9 is a vertical cross-sectional view of the first conveyor, adjacent the forward end of the base;

Figure 1:
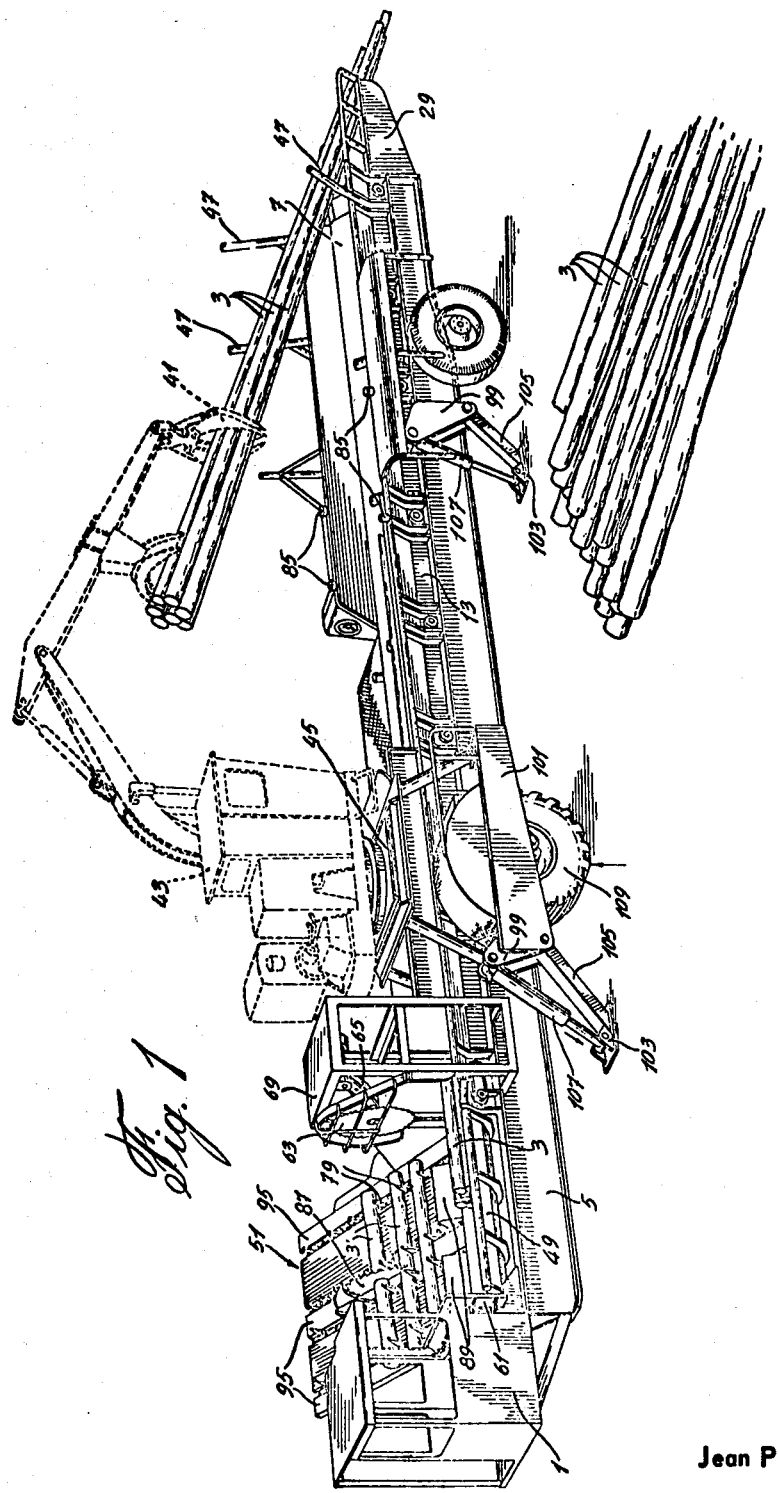
FIG. 1 is a lateral perspective view of a movable slasher made according to the invention.

With reference to FIG. 1, the rearward end of the slasher is to be taken where the cab 1 is mounted, the tree stems 3 being loaded on the forward end.

The slasher comprises an elongated wheeled base 5 over which is mounted a conveyor 7 extending generally longitudinally of the base 5. As best shown in FIG. 7, the conveyor comprises a series of generally arcuate horizontal bottom plates 9 spaced from one another and between each one of which is mounted a roller 11, each rotatable about a horizontal axis extending transversely of the conveyor. Rollers 11 are mounted for rotation on two sidewalls 13 (FIGS. 8 and 9) the upper ends of which bend outwardly and are provided with freely rotatable upward rollers 17 to ensure longitudinal displacement of all timber stems lying over the conveyor. All conveyor rollers 11 are of the gripping type, although only the end ones are thus shown in FIG. 7. Gripping of rollers 11 may be obtained through a series of spaced radial plates 19 having a serrated arcuate outer edge and secured to a central hub 21.

Rollers 11 are driven by means of a sprocket and chain arrangement 23 connected to a reversible motor 25 through a speed reducer 27.

Preferably, conveyor 7 has a detachable forward section 29 (FIGS. 1 and 2) for helping the free end of the stems 3 into the conveyor 7. This section slightly differs from the main section of the conveyor in that the lateral walls 31 thereof, here shown as made of tubing, are not only inclined outwardly but are also slightly flared forwardly. The forward end of the guiding section 29 may be provided with a freely rotatable gripping roller 11'.

In order to ensure that stems 3 by properly aligned and parallel with one another in conveyor 7, the invention proposes the provision of a kicking device 33 illustrated in details in FIG. 8. The latter is formed of an arcuate bottom plate 9' similar to the other bottom plates 9 and fixed to a generally rectangular frame 37. Frame 37 is secured, at the forward end thereof, on an axle 35 pivotally mounted on the conveyor sidewalls 13 in any known manner. A hydraulic motor or cylinder 39 is operatively mounted between the rearward end of the frame 37 and the base 5. It will be understood that intermittent operation of the hydraulic motor 39 will jerk or vibrate the bottom plate 9' in an upward direction thus slightly lifting the stems 3 to force them into parallel alignment.

As shown in FIG. 1, the stems 3 are moved onto conveyor 7 by means of the grapple 41 of a loader 43. The latter are shown in dotted lines since this equipment is conventional and does not form part of the invention. It is to be mounted over a pedestal structure 45 which should be constructed to receive any type of conventional loaders. The pedestal 45 may be built over conveyor 7 to rest on the slasher base 5. In view of the fact that stems 3 are normally grabbed at one end thereof, outwardly inclined guiding posts 47 may be provided at the forward end of the conveyor 7 to guide the free end of the stems into conveyor 7.

Rearwardly of conveyor 7 and in alignment therewith is a generally arcuate transfer table assembly 49 to discharge logs onto a laterally extending upwardly inclined second conveyor 51 to be described hereinafter. Assembly 49 is best illustrated in FIGS. 3 and 4. It will be seen to consist of a concave bed 53 terminating, on the lateral conveyor side, into a downwardly inclined apron 55. Bed 53 is pivotally mounted, adjacent apron 55, at the top of brackets 57 secured to the top of slasher base 5. A hydraulic motor or cylinder 59 is operatively connected between the bottom of the bed 53 and that of the base 5, to thereby cause pivoting of the bed 53 when actuated, as shown in dotted lines in FIG. 4. An abutment wall structure 61 (FIGS. 1 and 2) is provided at the rearward end of the bed 53 for the abutment of the stems 3 as the latter are driven rearwardly by the gripping rollers 11 of the first conveyor 7.

A first saw 63 is mounted to move in a vertical plane generally between the first conveyor 7 and the transfer table 49. Actually, and as best seen in FIG. 7, the saw is preferably mounted between the two end rollers 11 at the rearward end of the conveyor 7 but for practical purposes, it may be considered that it is mounted between the said conveyor 7 and the transfer table 49.

The first saw 63 is mounted for rotation at one end of an arm 65 of which the other arm is pivotally mounted on a bracket 67 fixed to the top of an upstanding frame 69 built on the slasher base 5. A hydraulic motor or cylinder 71 is operatively connected between the middle of arm 65 and the top of the upstanding frame 69, away from bracket 67. Operation of hydraulic motor 71 will move the saw 63 from an upper inoperative position shown in dotted lines in FIG. 3 to a lower operative position shown in full lines where saw 63 cuts the stems 3, mounted on the conveyor 7 and the transfer table 49.

A limit switch 73 is secured to a brace 75 of the upstanding frame 69 to be operated by the bearing of the first saw 63 when the latter is in the inoperative position. This limit switch is in the circuit of the reversible motor 25 (FIG. 7) and the arrangement is such that the rollers 11 can only be operated when the limit switch 73 is closed, that is, when saw 63 is in inoperative position. This is a safety measure to prevent rearward movement of stems 3 when the first saw 63 is in operative position.

The second conveyor 51 is detachably mounted as a unit on the slasher base 5. It is of the sawtooth type comprising two pairs of chains 77 over which are spacedly mounted right angular teeth 79. It will thus be understood that logs 3' cut from the stems 3 and received from the transfer table 49 will be moved up the incline of the second conveyor 51.

As shown in FIG. 2, a generally flat apron 81 is preferably provided, being pivoted at one end to the discharge end of the second conveyor 51. Apron 81 is downwardly inclined whereby to load logs into a truck or discharge them on a log pile. Its inclination may be adjusted through a telescoping connector 83 (FIG. 3) pivotally connected at one end to the slasher base 5 and at the other end to the free end of apron 81. Adjustment of the inclination of this apron 81 is obtained by adjustment of the inner and outer members of the telescoping connector 83. Locking may be by any known means such as by a pin extending through the inner and outer members.

As mentioned previously, the second conveyor 51, and apron 81 as well, can be detached from the base 5 and laid over four short posts 85 (FIG. 1) projecting from the sidewalls of the conveyor 7. In this manner, the width of the vehicle may be reduced to within the limits acceptable for driving on conventional roads.

In order to increase the efficiency of the slasher, a second saw 87 (FIGS. 1, 2 and 3) may be provided at the center of the second conveyor 57. Thus, a quicker cutting operation is provided than if only one saw was used.

Similarly to first conveyor 7 and for the same purpose, a pair of kicking devices 89 are provided on the receiving end of the second conveyor 57, adjacent the discharge end of the transfer table 49. As shown in FIG. 4, each such device comprises a table structure 91 pivotally mounted, as at 93, to longitudinal members 95 (FIG. 1) of conveyor 51. Vibration of the said kickers 89 is obtained by means of hydraulic motors or cylinders 97 operatively connected between the upper end of the table structures 91 and the slasher base 5.

In order to properly stabilize the slasher during operation and also to raise one end thereof or the complete slasher, triangular jacks such as those shown in FIG. 1, are provided on either side of frame 5. In the embodiment illustrated, each jack comprises an upstanding arm 99 fast with the base, directly through a mud guard structure 101; a foot plate 103 adapted to sit firmly on the ground; a bar 105 pivoted at the upper end to the lower end of the arm 99 and fixed, at the lower end, to the baseplate 103. This triangular structure is closed by a hydraulic motor or cylinder 107 operatively connected between the base 103 and the upper end of arm 99. Thus, a slight extension of the motors 107 will solidly stabilize the slasher while further extension will cause rising thereof by forcing the triangle to close. It will be noted here, as aforesaid, that the arm 99 is made solid with the slasher base 5.

Figure 5:
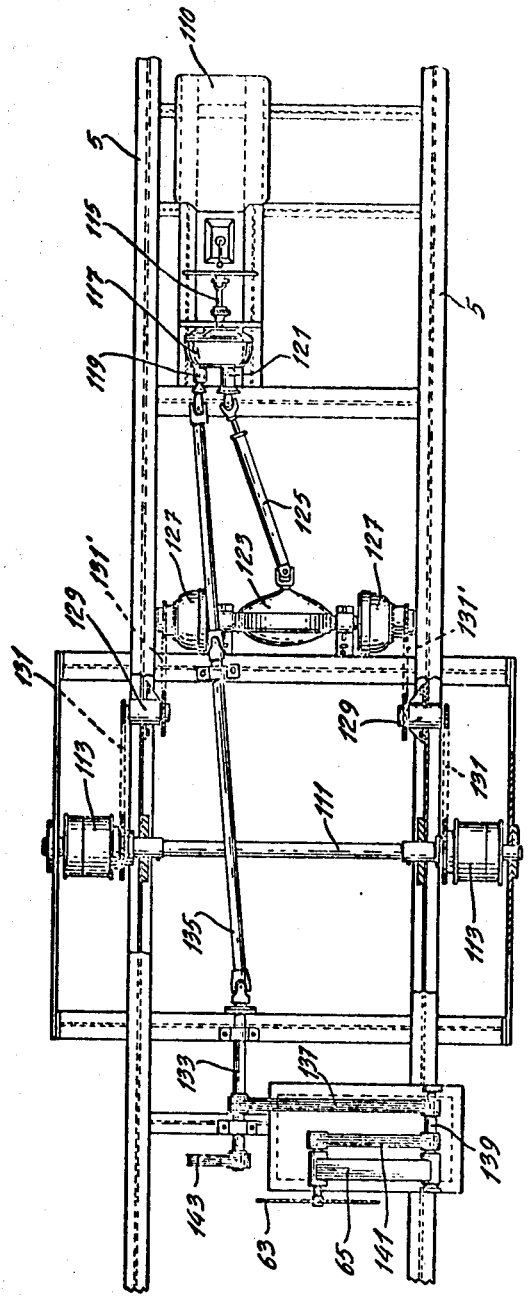
FIG. 5 is a partial plan view of the driving mechanism of the slasher.

Now with reference to FIG. 5 for a description of the power arrangement to drive the rear wheels 109 (see FIG. 1), the two saws 63 and 87 and the toothed chains 79 of the second conveyor 51.

As shown, a transverse rear axle 111 is mounted for rotation transversely of base frame 5 and is provided, at each outer end, with a wheel hub 113 over which the rear wheels 109 (FIG. 1) are mounted.

Power is drawn from an engine 110 secured on base 5 and having a power takeoff 115 operatively connected to a transfer case 117 of the conventional-type from which extend two power takeoffs 119, 121. Power takeoff 121 is connected to a differential 123 through a conventional universal connection 125. Differential 123 and the axles extending laterally therefrom are mounted transversely of base 5 with the interposition of conventional braking units 127. A pair of bearing units 129 are mounted on two longitudinal members of base 5 and sprocket chains 131, 131' interconnect the transverse axles of differential 123 to the rear axle 121 of the rear wheels 109.

As mentioned previously, the first saw 63, the second saw 87 and the toothed chains 77 of the second conveyor are preferably driven together, particularly the second saw 87 and the toothed chains 77 of conveyor 51. For this purpose, the second power takeoff 119 drives a common shaft 133 through a conventional universal connection 135. From this common shaft 133, a first chain drive 137 causes rotation of an auxiliary shaft 139 mounted on a lateral member of base 5 and to which is connected the sprockets of a second chain drive 141 directly coupled to the driving shaft of the first saw 63.

On the other hand, a third chain drive 143, connected at one end to the common shaft 133 drives an auxiliary shaft 145 (FIG. 2) on the lateral conveyor 51, the said auxiliary shaft 145 having mounted thereon the second saw 87. Finally, a fourth chain drive, generally denoted by numeral 147, is responsible for the simultaneous travelling of the toothed chains 77 of the said second conveyor 51.

It has been mentioned previously that one feature of the present invention is the provision of a reversible motor 25 (FIG. 7) for the rotation of the gripping rollers 11. This is advantageous in that when the timbers 10 are moved rearwardly by first conveyor 7 to finally abut the wall 61 (see FIG. 1) of the transfer table 49, it may happen that some of the lower stems may not have reached the said wall in which case the operator, standing in the operation cab 1, may cause the group of stems 3 to travel slightly forwardly by reversing the rotation of the rollers 11 and again rearwardly to bang them against the abutment wall 61 and allow the retarded stems to reach the abutment wall 61. In this manner, the operator will be ensured that all logs resulting from the cutting operation of the first saw 63 will have the same length.

Figure 10:
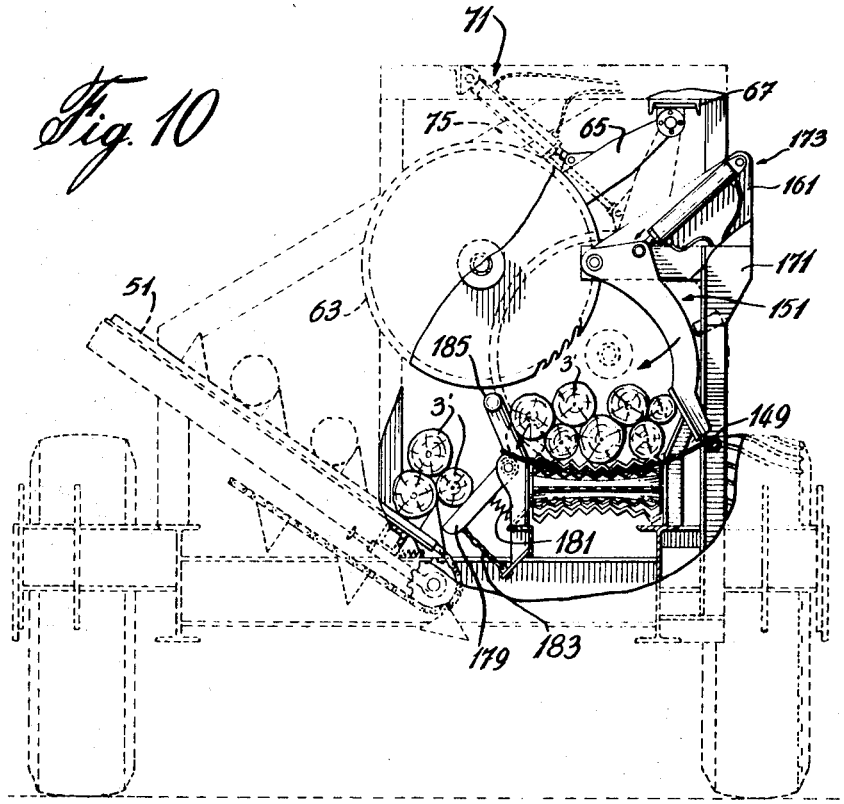
FIG. 10 is a view similar to that of FIG. 3 but illustrating a modified form of transfer table assembly.
Figure 11:
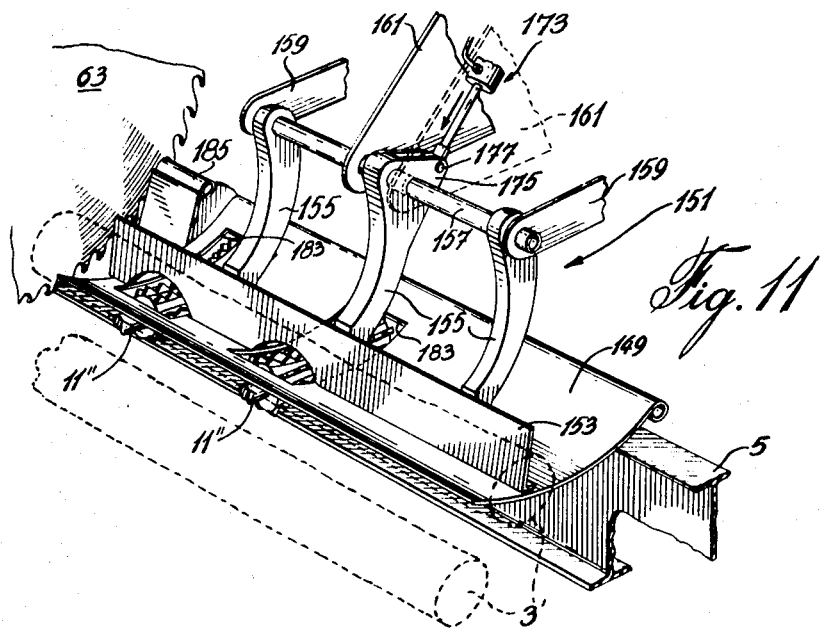
FIG. 11 is a perspective view of the modified transfer table.

Referring now to FIGS. 10 and 11, illustrating a modified form of assembly for transferring the logs 3' from the conveyor 7 to the conveyor 51, the transfer assembly generally comprises a stationary table 149, mounted on the base 5 of the slasher, the said table having an arcuate cross section similar to that of the bottom plates 9 (FIG. 7) of the first conveyor 7 and a sweeping mechanism 151 having a sweeping blade 153 movable laterally across table 149 to push logs 3' onto the second conveyor 51.

The sweeping mechanism 151 also comprises a plurality of swinging arms 155 spacedly fixed at one end to the back of the sweeping blade 153 and fixed, at the other end, on an axle 157, parallel to blade 153, and journaled on a pair of end brackets 159 and center brackets 161 secured to a frame 171 (FIG. 10) fixed to and upstanding from the base 5 of the slasher. One center bracket 161 is shown in dotted lines in order to clearly illustrate, in FIG. 11, the operating drive for the sweeping mechanism 151.

The drive of the sweeping mechanism is a hydraulic motor 173, of which the cylinder is pivoted to the brackets 161, above the axis of axle 157, and of which the piston rod is pivotally connected, through a pivot connection 177, to a bulge 175 of the center sweeping arm 155 rearwardly of axle 157 in relation to the sweeping blade 153.

From the above-described arrangement, it will be understood that extension of the hydraulic motor 173 will cause sweeping of the blade 153 laterally across table 149 and transfer of the logs 3' onto the second conveyor 51 and contraction of hydraulic motor 173 will cause reverse movement of blade 153.

Finally, the kicking devices 89 of the second conveyor 51 (FIGS. 1 and 4) may be replaced by one or several downwardly inclined aprons 79 pivoted, at the upper end thereof, to the base 5 of the slasher, beneath the stationary table 149 and adjacent the discharge end thereof. Aprons 179 are upwardly biased by means of springs 181, the upward movement of which being controlled by means of chains 183 one end of which is connected to the lower tip of aprons 179 and the other end of which is connected to the base 5. In this manner, as the logs 3 are discharged from table 149 onto conveyor 51, their weight will push aprons 179 back somewhat thus allowing proper alignment of the logs 3'.

A pair of inclined guiding walls 185 may be used between arcuate table 149 and the first saw 63 to guide the tree stems from the conveyor 7 to the transfer table 149.

Finally, additional gripping rollers 11'', similar to previously mentioned rollers 11, may be provided across table 149 and through suitable apertures 183 to help move logs 3' along.

I claim:

1. In a movable slasher for cutting tree stems into logs and having a base over which a first conveyor is mounted for moving tree stems onto a transfer table mounted on said base, level and in alignment with said first conveyor; the said table having an upstanding wall at the rear end thereof for arresting stems moved by the first conveyor; there being a saw between the end of the first conveyor and the transfer table to cut stems into logs and there being a second conveyor mounted on said base to extend laterally away from said transfer table to pick up and convey logs discharged from said transfer table and convey them away therefrom; the improvement in means on said transfer table for discharging logs thereon onto said second conveyor, said means comprising:
   a. a table top for said transfer table, having an arcuate cross section in a direction transverse to the direction of travel of said logs on said first conveyor and on said transfer table;
   b. an elongated blade mounted to extend lengthwise of said arcuate table top and to be swept thereacross to discharge logs standing on said table top into said second conveyor; and
   c. means to cause sweeping of said blade across said table top and including at least one swinging arm fixed at one end to said blade and mounted at the other end for pivotal motion about a horizontal axis above said table top, said sweeping means further including power means to cause swinging of said arm and blade.

2. The improvement of claim 1 wherein said table top has a set of transverse apertures therethrough and gripping rollers mounted to project partially beyond said aperture and thereacross and mounted to rotate about axes transverse to said table whereby to urge said logs towards said upstanding arresting wall at the rear end of said table.

3. The improvement of claim 1 including at least one solid apron pivotally connected along one edge thereof to the discharge edge of said table top and downwardly inclined from said top to said second conveyor to guide logs from said transfer table to the said second conveyor, resilient means biasing said apron upwardly and means to limit upward movement of said apron under said bias.